US010569728B2

(12) United States Patent
Martin

(10) Patent No.: US 10,569,728 B2
(45) Date of Patent: Feb. 25, 2020

(54) METHOD AND SYSTEM FOR WATER USAGE ON-BOARD A VEHICLE

(71) Applicant: Ford Global Technologies, LLC, Dearborn, MI (US)

(72) Inventor: Douglas Martin, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 28 days.

(21) Appl. No.: 15/933,035

(22) Filed: Mar. 22, 2018

(65) Prior Publication Data

US 2019/0291665 A1   Sep. 26, 2019

(51) Int. Cl.
| | |
|---|---|
| B60R 16/08 | (2006.01) |
| B60L 7/10 | (2006.01) |
| B60T 1/02 | (2006.01) |
| B60L 8/00 | (2006.01) |
| B60H 1/32 | (2006.01) |
| B01D 53/26 | (2006.01) |
| B60L 1/00 | (2006.01) |
| F01P 3/02 | (2006.01) |
| B60C 23/19 | (2006.01) |
| F16D 65/00 | (2006.01) |
| B60S 1/50 | (2006.01) |

(52) U.S. Cl.
CPC ............ B60R 16/08 (2013.01); B01D 53/265 (2013.01); B60H 1/3233 (2013.01); B60L 1/00 (2013.01); B60L 7/10 (2013.01); B60L 8/003 (2013.01); B60T 1/02 (2013.01); B60C 23/19 (2013.01); B60L 2240/12 (2013.01); B60L 2240/423 (2013.01); B60S 1/50 (2013.01); B60Y 2200/11 (2013.01); B60Y 2400/112 (2013.01); B60Y 2400/302 (2013.01); B60Y 2400/92 (2013.01); F01P 3/02 (2013.01); F01P 2003/024 (2013.01); F16D 65/0037 (2013.01); Y10S 903/904 (2013.01)

(58) Field of Classification Search
CPC combination set(s) only.
See application file for complete search history.

(56) References Cited

U.S. PATENT DOCUMENTS

| | | |
|---|---|---|
| 3,817,221 A | 6/1974 | Nohira et al. |
| 4,725,359 A | 2/1988 | Ray |

(Continued)

FOREIGN PATENT DOCUMENTS

EP   2607647 A1   6/2013

OTHER PUBLICATIONS

Bohm, M. et al., "Approaches for On-board Water Provision for Water Injection," ATZ Worldwide, vol. 118, No. 1, Jan. 2016, 4 pages.

*Primary Examiner* — Aaron L Troost
(74) *Attorney, Agent, or Firm* — Geoffrey Brumbaugh; McCoy Russell LLP

(57) ABSTRACT

Methods are provided for optimizing generation of water on-board a vehicle with reduced impact on fuel economy. Regenerative braking energy, and/or solar energy, in excess of what is required for charging a system battery, is used to operate a water extractor and save the captured energy as stored water. A proportion of the braking energy used to charge the battery versus operate the water extractor is adjusted as a function of operating conditions including a water level in a water reservoir on-board the vehicle.

18 Claims, 5 Drawing Sheets

(56) References Cited

U.S. PATENT DOCUMENTS

| | | | |
|---|---|---|---|
| 5,435,151 A | 7/1995 | Han | |
| 6,581,375 B2 | 6/2003 | Jagtoyen et al. | |
| 7,431,238 B2 | 10/2008 | Hoffjann et al. | |
| 8,252,174 B2 | 8/2012 | Jones et al. | |
| 9,140,396 B2 | 9/2015 | Kohavi et al. | |
| 2004/0040322 A1 | 3/2004 | Engel et al. | |
| 2004/0239181 A1* | 12/2004 | Obayashi | B60L 7/26 |
| | | | 303/152 |
| 2013/0291580 A1 | 11/2013 | Lindner | |
| 2014/0190148 A1 | 7/2014 | Ruhland et al. | |
| 2016/0083936 A1* | 3/2016 | Martin | B01D 5/006 |
| | | | 261/128 |
| 2016/0241110 A1* | 8/2016 | Maguire | H02K 9/04 |
| 2018/0272873 A1* | 9/2018 | Rohera | H02J 7/0063 |

* cited by examiner

METHOD AND SYSTEM FOR WATER USAGE ON-BOARD A VEHICLE

FIELD

The present description relates generally to methods and systems for a water generating system, on-board a vehicle, to improve vehicle fuel economy.

BACKGROUND/SUMMARY

Water may be injected into a plurality of locations in a vehicle system to address various issues. For example, water may be injected into an engine intake manifold to humidify the air charge, or into an exhaust manifold to purify the exhaust gas. As another example, water may be injected directly into a combustion chamber for knock control or temperature control. In still other examples, water may be sprayed onto the surface of a vehicle component to clean or cool the component (such as onto a windscreen, a camera lens, a vehicle body, etc.), or to remove particulate matter. Further still, the water may be processed (e.g., filtered or distilled) to provide potable water that can be consumed by a vehicle occupant.

The disbursed water may be sourced from a water generating system present on-board the vehicle. For example, water generated as a side product during vehicle operation, such as during fuel combustion in a cylinder, during operation of an air-conditioning system, due to condensation on a vehicle surface, etc., may be harvested, processed, and stored by the water harvesting system. One example of a water generating system available on-board a vehicle is shown by Martin et al in US20160083936. Additionally or optionally, the water generating system may include an electrically powered water generator that uses electric power to harvest water from ambient humidity. An example of a water generating system coupled to a vehicle is shown by Engel et al. in US20040040322. Therein, the water generating system includes a compressor, an evaporator, a fan, and a condenser, and the system acts largely as a dehumidifier. Air is drawn into the system by the fan. As the air passes over the cold surface of the evaporator, its moisture condenses, and is collected in a reservoir. The air may be reheated via a heat exchanger at the condenser before being released from the system.

One potential issue with such an on-board water generating system is that it consumes power to condense and process the water from the atmosphere. This reduces the fuel economy of the vehicle. The impact may be even larger in vehicles that rely on electrical power to propel the vehicle, such as on battery electric or hybrid electric vehicles (such as BEV's, HEVs and PHEVs). There may also be situations where the electrical power needed to generate the water may conflict with the electrical power requirement for other vehicle functions such as for propelling an electrified vehicle, operating a compressor, regenerating a particulate filter, etc. In the case of water generating systems that rely on trapping condensate from an HVAC system, the water generation requires HVAC operation, which is based on the preferences of a cabin occupant. As a result, there may be situations where HVAC operation is required for water generation, but the cabin occupant does not want HVAC operation.

In one example, the above issues may be addressed by a method for a vehicle comprising: operating a water generator on-board the vehicle using electrical energy to harvest water from ambient air, wherein the operating of the water generator is based on a water level in a water reservoir of the vehicle and excess electrical energy generated on the vehicle. In this way, excess electrical energy generated during vehicle operation can be leveraged for generating water on-board the vehicle.

As one example, a vehicle may be configured with a water generation system for harvesting water trapped in ambient air. The harvested water may be stored in a water reservoir. The water generation system may be operated whenever excess electrical power is available from the vehicle, such as when there is excess regenerative braking energy. For example, during a vehicle deceleration event, regenerative braking energy may be used to charge a system battery up until a threshold state of charge, beyond which the battery cannot accept further charge. If the brake energy available on the deceleration event exceeds the charge accepting capability of the battery, the excess braking energy may be applied to the water generation system. As a result, the need to use friction brakes to achieve a desired level of vehicle braking is reduced. In one example, where the vehicle includes a smart alternator, the alternator may distribute the regenerative braking energy between the system battery and the water generation system as a function of the battery state of charge, and further based on a water level of the reservoir. For example, even if the battery is capable of accepting of a larger portion of the regenerative braking energy, responsive to the water level in the reservoir being lower than a threshold, or in anticipation of water usage over a drive cycle (such as based on navigational input indicative of knock prone engine operation), the larger portion of the regenerative braking energy may be directed to the water generation system. In a further example, if the regenerative braking energy received in the water generation system causes the water level in the reservoir to exceed the threshold, water flow to various water consumers may be increased. For example, water flow to a CCD camera washer, a tire or brake particulate suppressing water nozzle, and a potable water making unit may be increased. Additionally, windshield wiper fluid and coolant fluid levels may be topped off.

In this way, water generation on-board a vehicle may be optimized while improving vehicle fuel economy. The technical effect of using regenerative braking energy to power a water generation system, particularly after a rate capability of a system battery has been exceeded, is that water can be opportunistically generated while reducing the need for friction brakes to decelerate a vehicle. By reducing the reliance on friction brakes, fuel economy is improved and brake life is extended. By proportioning the braking energy, such as via a smart alternator, between charging a system battery and operating the water generation system as a function of the water level in a reservoir on-board the vehicle, water may be made available the vehicle for various water usages. By also adjusting the rate of water usage based on water generation anticipated over the drive cycle, water harvesting via use of regenerative braking energy can be extended over a larger portion of the drive cycle. By relying on excess braking energy to harvest water, reliance on electrical power for harvesting water is reduced. By reducing the need for electrical power, such as from an electric motor of the vehicle, vehicle fuel economy is improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
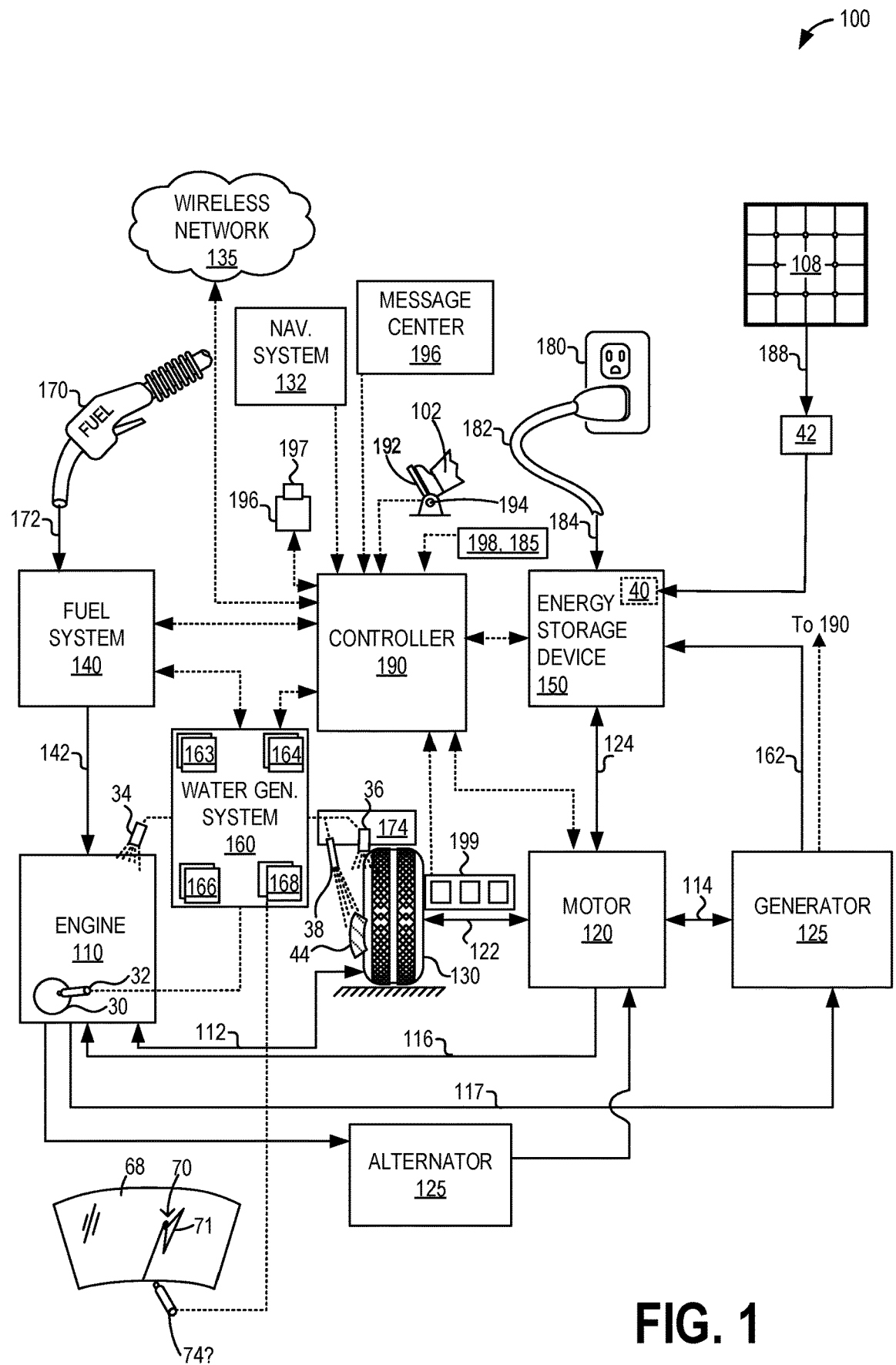
FIG. 1 shows a schematic diagram of a vehicle system including an on-board water generation system.

The following description relates to systems and methods for operating a water generation system coupled on-board a vehicle, such as the vehicle system of FIG. 1. The water generation system, such as the system of FIG. 2, may be configured to harvest water from ambient air. A controller may be configured to perform a control routine, such as the example routine of FIG. 3, to use solar energy or regenerative braking, in excess of an amount required to charge a system high voltage battery, to operate the water generation system. In addition, as shown with reference to FIG. 4, the controller may proportion an amount of regenerative braking energy between charging a system battery and operating the water generation system during a vehicle deceleration event based on a water level in the water reservoir of the vehicle relative to an anticipated rate of water usage. An example water generation system operation using excess electrical energy is described with reference to FIG. 5. In this way, water harvesting can be performed in a fuel efficient manner. Further, the vehicle performance benefits of water injection can be leveraged.

FIG. 1 illustrates an example vehicle propulsion system 100. Vehicle propulsion system 100 includes a motor 120 and a fuel burning engine 110. As a non-limiting example, engine 110 is an internal combustion engine and motor 120 is an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (e.g., set to a deactivated state) where combustion of fuel at the engine is discontinued. For example, under select operating conditions, motor 120 may propel the vehicle via drive wheel 130 as indicated by arrow 122 while engine 110 is deactivated (herein also referred to as an electric-only mode).

During other operating conditions, engine 110 may be set to a deactivated state (as described above) while motor 120 may be operated to charge an energy storage device 150. For example, motor 120 may receive wheel torque from drive wheel 130, as indicated by arrow 122, and may convert the kinetic energy of the vehicle to electrical energy for storage at energy storage device 150, as indicated by an arrow 124. This operation may be referred to as regenerative braking of the vehicle. Thus, motor 120 may function as a generator in some examples. However, in other examples, a generator 125 may instead receive wheel torque from drive wheel 130 and may convert the kinetic energy of the vehicle to electrical energy for storage at energy storage device 150, as indicated by an arrow 114. As an additional example, motor 120 may use energy stored at energy storage device 150 to crank engine 110 in a starting operation, as indicated by an arrow 116. Herein, the energy storage device 150 is a high voltage storage device, such as a system battery coupled to a 48V electrical architecture of the vehicle. In one example, the system battery is a Lithium ion battery.

During still other operating conditions, engine 110 may be operated by combusting fuel received from a fuel system 140, as indicated by an arrow 142. For example, engine 110 may be operated to propel the vehicle via drive wheel 130, as indicated by an arrow 112, while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some examples, motor 120 may propel the vehicle via a first set of drive wheels and engine 110 may propel the vehicle via a second set of drive wheels.

In other examples, vehicle system 100 may be configured as a series type vehicle propulsion system, whereby the engine does not directly propel the drive wheels. Rather, engine 110 may be operated to power motor 120, which may in turn propel the vehicle via drive wheel 130, as indicated by arrow 122. For example, during select operating conditions, engine 110 may drive generator 125, as indicated by arrow 117, which may in turn supply electrical energy to one or more of motor 120, as indicated by an arrow 114, or energy storage device 150, as indicated by arrow 162. As another example, engine 110 may be operated to drive motor 120, which may in turn function as a generator to convert the engine output to electrical energy. The electrical energy may be stored at energy storage device 150 for later use by the motor, for example.

Fuel system 140 may include one or more fuel tanks for storing fuel on-board the vehicle. For example, fuel tank may store one or more liquid fuels, including but not limited to: gasoline, diesel, and alcohol fuels. In some examples, the fuel may be stored on-board the vehicle as a blend of two or more different fuels. For example, fuel tank may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to generate electricity by operating alternator 126, said electricity used to directly power motor 120, or to recharge energy storage device 150.

In one example, alternator 126 is a smart alternator that is capable of generating an amount of electrical current in proportion to its input control signal. As elaborated with reference to FIGS. 3-4, smart alternator may be configured to generate large amounts of power during engine braking, such as during a deceleration event. This power may be used to operate a water generation system 160, the power then stored in the form of harvested water in a water reservoir 168 on-board the vehicle.

In some embodiments, energy storage device 150 may be configured to store electrical energy that may be supplied to other electrical loads residing on-board the vehicle (other than the motor), including a cabin heating and air conditioning system, engine starting system, headlights, cabin audio and video systems, etc. As a non-limiting example, energy storage device 150 may include one or more batteries and/or capacitors.

Propulsion system 100 further includes a water generation system 160 configured to generate and store water on-board the vehicle. Water generation system 160 may include an electric motor for harvesting water from humidity in ambient air. Additionally, water generation system may capture water vapor and condensation occurring on the vehicle system. The captured condensation may be generated (or emitted) as a by-product of various vehicle operations, such as condensate trapped at one or more heat exchangers of the vehicle system. As an example, where engine 110 is a boosted engine including an intake compressor, condensate may be generated at a charge air cooler coupled to the engine intake downstream of the compressor during boosted engine operation. As another example, where the vehicle includes an air-conditioning system, condensate may be generated at a condenser of the air-conditioning system during a vehicle cabin cooling operation. As yet another example, water may be generated by a fuel separator coupled to fuel system 140. Still other vehicle components whose operation can generate condensate include motor 120, a fuel cell, an electric motor cooling system, etc.

Figure 2:
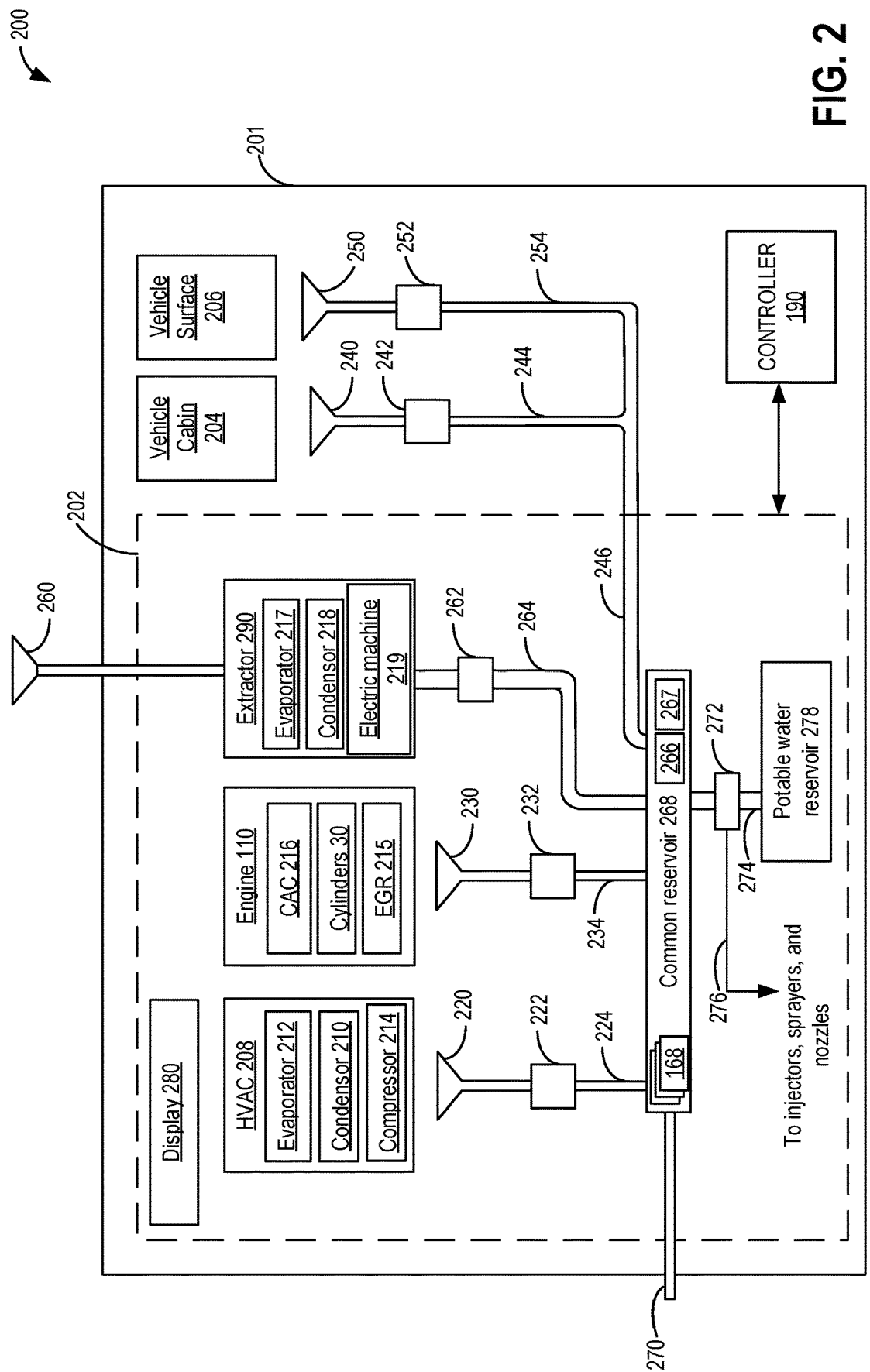
FIG. 2 shows an example embodiment of an on-board water generation system that may be included in the vehicle system of FIG. 1.

As elaborated with reference to FIG. 2, water may be generated and transported to a reservoir where the water is processed before being used for various applications on-board the vehicle system. Accordingly, water generation system may include various components such as one or more pumps 163, one or more valves 164 (such as flow control valves, check valves, dispensing valves, etc.), one or more water processing devices (such as filters, distillers, ion-exchangers, etc.) 166, and one or more reservoirs 168. Still other components may be included in water generation system 160 without departing from the scope of this invention.

The harvested water may be used for spraying onto or injected into various vehicle components based on operating conditions. As one example, water may be injected into an engine cylinder 30 via a water injector 32. The water injector 32 may inject water directly into the engine cylinder 30, for example, responsive to an indication of engine knock. Additionally or optionally, water injector 32 may inject water into an intake manifold of engine 110. For example, water may be injected into the intake manifold responsive to a demand for engine dilution, such as when combustion stability is limited.

As another example, water pumped from water generation system 160 may be supplied to a windshield wiper system that enables cleaning of a vehicle windshield 68. Windshield 68 may be a front or rear windshield of the vehicle. The windshield wiper system includes at least one windshield wiper 70 operated by a wiper motor (not shown). In response to an operator demand, and based on input from controller 190, the wiper motor may be energized causing wiper 70 to make multiple sweeping cycles known as wipes or sweeps over windshield 68. The wipes or sweeps enable wiper blade 71 to remove moisture, debris, and foreign particles from the surface of windshield 68. While wiper blade 71 is sweeping, based on request from a vehicle operator, controller 190 may intermittently inject or squirt a wiper fluid (herein also referred to as a washer fluid) onto the windshield via wiper injector 74. In one example, the wiper fluid includes water sources from a reservoir of water generation system 160. Alternatively, washer fluid may be stored in a wiper fluid reservoir from where it is delivered to the windshield, and water may be provided to the reservoir from water generation system 160, such as to top off the washer fluid. The washer fluid stored in the reservoir may include a combination of water and alcohol, such as methanol or isopropanol.

As another example, water may be sprayed onto the engine, such as onto a cylinder head, by cylinder head nozzle 34. Water may be sprayed onto the cylinder head for engine temperature control. For example, when an engine cooling system fails, the cylinder head temperature may exceed an engine shutdown temperature before round-robin fuel injector cuts can limit the temperature increase at the engine. Responsive to the cylinder head temperature rise (e.g., a higher than threshold temperature or a higher than threshold rate of rise in temperature), a pump of water generation system 160 may be operated to spray water onto the cylinder head via cylinder head nozzle 34. Operation of the nozzle may generate a mist that limits or slows down the rapid rise in temperature at the cylinder head. The amount of water dispensed may be a function of the temperature rise. The nozzle may be optimized to spread the spray over a maximum area of the cylinder head, or optimized to concentrate the spray to a localized hot area on the head, as dictated by the heat pattern generated in the cylinder head during cooling system degradation. The individual spray pattern can be selected by the design of a nozzle adapted from fuel injectors whose spray pattern is known. For nozzles passing water with particulates, a single larger hole for the nozzle may be used to pass the dirt and preclude nozzle contamination or blockage.

Likewise, water may be sprayed onto brake pads 44 coupled to drive wheel 130 via brake nozzle 38. Brake nozzle 38 may also be coupled to undercarriage 174, at a location above drive wheel 130, and adjacent to tire nozzle 36. Water may be sprayed by brake nozzle 38 onto or towards the brake pads 44 to remove particulates from the surface of the brake pad. For example, tire nozzle 38 may be operated when vehicle speed is above a threshold, such as above 3 mph. In addition, operation of the tire nozzle 38 may be determined as a function of the tire temperature or the ground temperature. As the ground temperature, and therefore the tire temperature rises, tire water spraying may be increased. Alternatively, water may be sprayed by brake nozzle 38 into the air at a location where brake particulates exit the brake pads and associated brake motors, such as behind the rear lower portion of the tires where it departs the ground during rotation. Since brake particulate generation increases during braking events, brake nozzle 38 may be selectively operated during braking maneuvers of the vehicle. For example, brake nozzle 38 may be operated when vehicle speed is below an upper threshold, but above a lower threshold, such as between 3 and 55 mph. This allows the particulates released from the brake pads 44 into the air to be coagulated in the sprayed mist, and fall to the ground instead of remaining air-borne.

Further still, as elaborated with reference to FIG. 2, water harvested by the water generation system 160 may be processed to make potable water that is available on-board the vehicle to a vehicle operator Vehicle system 100 may also include one or more solar cells 108, operative to convert incident solar radiation into electrical energy. The solar cells 108 may be electrically coupled to a solar battery 40 via a charge controller 42. Solar cells 108 and charge controller 42 are operative to supply electrical current for charging solar battery 40. In this example, solar battery 40 is housed within and electrically coupled to energy storage device 150, but in other configurations, solar battery 40 may be electrically coupled to energy storage device 150 while being housed separately. Solar battery 40 may thus be configured to provide or receive charge from energy storage device 150, depending on engine operating conditions, charge status, and battery requirement(s). In still other configurations, solar battery 40 may be both physically and electrically isolated from energy storage device 150. In some examples, solar battery 40 may be configured to independently supply charge directly to vehicle actuators and devices. In still further examples, charge controller 42 may be used to directly supply power to vehicle actuators and devices without requiring charge to first be stored in solar battery 40.

Solar cells 108 may be mounted on any convenient exterior surface of the vehicle, for example a vehicle roof, hood, trunk, etc. However, solar cells 108 may additionally or alternatively be mounted on the interior of the vehicle, such as on a dashboard or other passenger compartment surface in proximity to a window or interior light bulb. In general, the solar cells are operative to convert solar radiation incident thereon into electrical energy. In some embodiments, solar cells 108 may comprise a series of photovoltaic cells formed from an amorphous semi-conductor material, such as silicon. Additionally, individual photovoltaic cells may be interconnected so as to provide a constant flow of electrical energy to a common output cable 188, which electrically couples solar cells 108 to charge controller 42 and solar battery 40. In this way, solar cells 108 may generate electrical energy with which to propel the vehicle or power one or more additional vehicle actuators and devices, including components (e.g., an electric motor and/or pumps) of water generation system 160.

Control system 190 may communicate with one or more of engine 110, motor 120, fuel system 140, energy storage device 150, and alternator 125. Control system 190 may receive sensory feedback information from one or more of engine 110, motor 120, fuel system 140, energy storage device 150, and alternator 125. Further, control system 190 may send control signals to one or more of engine 110, motor 120, fuel system 140, energy storage device 150, and alternator 125 responsive to this sensory feedback. Control system 190 may receive an indication of an operator requested output of the vehicle propulsion system from a vehicle operator 102. For example, control system 190 may receive sensory feedback from pedal position (PP) sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle, whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may be disconnected from the power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it will be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel system 140 may be configured to store the fuel received from fuel dispensing device 170 until it is supplied to engine 110 for combustion. In some embodiments, control system 190 may receive an indication of the level of fuel stored at a fuel tank of the fuel system via a fuel level sensor. The level of fuel stored in the fuel system 140 (e.g., as identified by the fuel level sensor) may be communicated to the vehicle operator, for example, via a fuel gauge or indication in a vehicle instrument panel 196. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, in response to the vehicle operator actuating refueling button 197, a fuel tank in the vehicle may be depressurized so that refueling may be performed. As another example, a water level in a water reservoir 168 of the water generation system 160 may be displayed to a vehicle operator via the instrument panel 196.

The vehicle system 100 may also include one or more sensors such as an ambient temperature or humidity sensor 198, an engine temperature sensor 185, and a vehicle speed sensor 199. In one example, engine temperature sensor 185 is an engine coolant temperature (ECT) sensor wherein the engine temperature is inferred from the engine coolant temperature. In another example, engine temperature sensor 185 is a cylinder head temperature (CHT) sensor wherein the engine temperature is inferred from the cylinder head temperature. Still other sensors may be coupled to the vehicle system.

Control system 190 (herein also referred to as controller 190) may be communicatively coupled to other vehicles or infrastructures using various appropriate communications technologies. For example, control system 190 may be coupled to other vehicles or infrastructures via a wireless network 135, which may comprise Wi-Fi, Bluetooth, a type of cellular service, a wireless data transfer protocol, and so on. Control system 190 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I or V2X) technology. Information exchanged between vehicles can be either directly communicated between vehicles or can be multi-hop. In some examples, longer range communications (e.g. WiMax) may be used in place of or in conjunction with V2V or V2I2V to extend the coverage area by a few miles. In still other examples, vehicle control system 190 may be communicatively coupled to other vehicles or infrastructures via wireless network 135 and the internet (e.g. the cloud).

Vehicle system 100 may also include an on-board navigation system 132, such as a Global Positioning System (GPS), that an operator of the vehicle may interact with. The navigation system 132 may include one or more location sensors for assisting in estimating vehicle speed, vehicle altitude, vehicle position/location, etc. This information may also be used to infer engine operating parameters, such as local barometric pressure. In additional, the information may be used for travel route planning including weather, road, and traffic conditions along a planned route of travel. As discussed above, control system 190 may be further configured to receive information via the internet or other communication networks. Information received from the GPS may be cross-referenced to information available via the internet to determine local weather conditions, local vehicle regulations, etc. In this way, the control system 190 is configured to receive navigational input from navigation system 135.

The controller 190 receives signals from the various sensors of FIG. 1 and employs the various actuators of FIG. 1 to adjust engine operation based on the received signals and instructions stored on a memory of the controller. For example, based on signals received from a water level sensor of the fuel system, the controller may send a signal to operate the water generation system to generate water.

Turning now to FIG. 2, a detailed embodiment 200 is shown for a water generation system 202 coupled in a vehicle 201 configured for on-road propulsion. The embodiment enables water to be harvested from one or more components of the vehicle, as well as from ambient humidity. Components previously introduced in FIG. 1 are numbered the same and are not reintroduced for reasons of brevity. In one example, water generation system 202 includes water generation system 160 of FIG. 1, and vehicle 201 includes vehicle system 100 of FIG. 1.

Water generation system 202 is coupled to various components of vehicle 201. For example, water generation system 202 is coupled to a heating, ventilation, and air-conditioning (HVAC) system 208. HVAC system 208 is configured to adjust a temperature of vehicle cabin 204 based on input from a vehicle occupant. HVAC system 208 includes a condenser 210, an evaporator 212, and a compressor 214. The condenser 210 is essentially a heat-exchanger disposed outside of a passenger compartment of the vehicle while the evaporator is essentially a heat-exchanger disposed within the passenger compartment of the vehicle. The compressor 214 may be driven by the engine 110, such as by the use of an auxiliary drive belt off a crankshaft (not shown), or an auxiliary drive belt off an electric machine (such as electric motor 120 of the hybrid driveline of FIG. 1), or by having a separate compressor motor (not shown). The compressor motor may be provided energy from an on-board energy storage device, which may be a high voltage traction battery or from a 12 volt battery (not shown).

Other components that may be included in HVAC system 208, but are not shown, include a pressure regulator, an expansion valve, an accumulator, a receiver, a desiccant filter, or the like. A series of ducts may route conditioned air from the evaporator 212 into the vehicle cabin 204. Optionally, a fan (not shown) may be employed adjacent the condenser 210 to aid in improved airflow across the heat-exchangers, an/or a fan may be disposed within the series of ducts to aid in airflow across the heat-exchangers.

As HVAC system 208 runs, water may condense on the condenser 210 and the evaporator 212. Condensation is generally known as a change in the state of water vapor to liquid water when in contact with any surface. Generally when the HVAC system 208 is used to cool vehicle cabin 204, condensation may occur at least on the condenser 210 which is located outside of vehicle cabin 204 and is in fluid contact with the ambient environment. The water that condenses on condenser 210 is from water vapor formerly held within air surrounding the condenser.

Water generation system 202 may include an HVAC water collector 220 located near condenser 210 and configured to collect condensed water from the condenser 208. The collector may be located below the condenser 208 (or at a location near a bottom surface of the condenser 208) so that water may be transferred from the condenser 210 to the HVAC water collector 220 using gravity. The HVAC collector 220 may be fluidly connected to one or more HVAC water processing components 222 including an HVAC water collection valve. Other water processing components 222 coupled to HVAC water line 224 may include a collection pump, a collection filter, etc.

For example, the collection valve may be a three-way valve, or a series of T-shaped valves that can be electrically actuated. By adjusting the operation of the collection valve, water may be diverted from HVAC water collector 220 to a common water reservoir 268. In some embodiments, water collected from the HVAC system may be initially stored in one of a plurality of water reservoirs 168, such as a water reservoir dedicated to collecting water from the HVAC system. The water may be treated and processed locally in the dedicated water reservoir before being transferred into common water reservoir 268 where the water collected from the HVAC system is merged with water collected from other sources.

As another example, HVAC water line 224 may include a filter with a mesh screen that is used for the separation of solids (such as small particulates) from the collected fluid by interposing a medium through which the fluid can pass but not solids larger than the mesh sizing. The filter may also be a chemical or ultraviolet filtration device which may be used to filter out undesirable bacteria, organic carbons, or the like. The filter may be included in the HVAC water line 224 after or before the collection valve. Similarly, HVAC water line 224 may include a pump located before or after the filter. The system may also operate without a filter or pump, or with multiple filters and pumps along HVAC water line 224 to provide a desired degree of filtration, to move water, or to provide pressure where desired. As will be elaborated herein, each of the different water lines may include a different set of water processing components for processing water differently based on the source of the water as well as the intended use of the water. For example, if the water harvested from the HVAC system 208 is used primarily for injecting onto the cylinder head (such as via cylinder head nozzle 34 of FIG. 1), onto tires (such as via tire nozzle 36) and/or onto brake pads (such as via brake nozzle 38 of FIG. 1), a lower degree of water processing may be required. As an example, a filter having a larger mesh size, or no filtering may be included in HVAC water line 224. In comparison, if the water harvested from the HVAC system 208 is used primarily for injecting into the cylinder (such as via water injector 32 of FIG. 1), a higher degree of water processing may be required. As an example, a filter having a smaller mesh size may be included in HVAC water line 224.

In some examples, a vehicle controller may actively operate the HVAC system 208 to generate condensed water even when the vehicle 100 is in a key-off state. HVAC system 208 may be operated based on inputs from the water generation system 202 (such as based on a water level in reservoir 268) so as to generate condensed water. In one example, water is generated by operating the HVAC system while the vehicle 100 is plugged into an external power source to recharge a system energy storage device. In another example, water is generated by operating the HVAC system while the vehicle is operating, such as by increasing the load on the condenser 210.

Water generation system 202 may also collect water condensed at engine 110. In particular, engine water collector 230 may be coupled to an engine block at a location from where water generated by engine cylinders 30 (due to cylinder combustion), charge air cooler 216 (due to boosted engine operation), and an EGR cooler (coupled to an EGR system 215) can be collected. The collector may be located below the CAC 216 (or at a location near a bottom surface of the CAC 216) so that water may be transferred from the CAC 216, and any other engine heat exchangers, to the engine water collector 230 using gravity. The engine collector 230 may be fluidly connected to one or more engine water processing components 232 including an engine water collection valve, a collection pump, a collection filter, etc. These components may be similar to those described earlier with reference to the HVAC system 208. The collected water is then delivered along engine water line 234 to the common reservoir 268. For example, water collected from the engine 110 may be initially stored in one of a plurality of water reservoirs 168, such as a water reservoir dedicated to collecting water from the engine system. The water may be treated and processed locally in the dedicated water reservoir before being transferred into common water reservoir 268 where the water collected from the engine system is merged with water collected from the other sources.

Water generation system 202 may also collect water condensed on the vehicle surface 206 as well as any water condensed in the vehicle cabin 202. For example, surface water collector 250 may be coupled to catch channels incorporated into one or more of the side of the windshield, the windshield column, the rubber sealing bordering the windshield, an outer edge of a side door, the space between the side door and the windshield column. At least some of these catch channels may include a front edge which protrudes outwardly from the external surface of the vehicle to enhance water catching. The catch channels prevent the water from going inside the vehicle cabin. Via these channels, water condensed on the surface of the vehicle, water from precipitation such as rain, or other water blown across the vehicle's surface by the force of wind resulting from the travel of the vehicle can be harvested at the surface water collector 250.

Similarly, cabin water collector 240 may be coupled to catch channels incorporated inside the vehicle cabin, such along an inner edge of a side door. Via these channels, water condensed on the inner surface of the vehicle, such as due to ambient humidity and from cabin occupants can be harvested at the cabin water collector 240.

Like the HVAC and engine water collectors 220, 230, the surface water collector 250 and the cabin water collector 240 may be fluidly connected to one or more water processing components 252 and 242, respectively, including corresponding water collection valves, collection pumps, collection filters, etc. These components may be similar to those described earlier with reference to the HVAC system 208 and engine system 110. The collected water is then delivered along surface water line 254 and cabin water line 244, respectively, to the common reservoir 268. For example, water collected from each of the vehicle surface 206 and the vehicle cabin 204 may be initially stored in distinct one of a plurality of water reservoirs 168. In the depicted example, water lines 244, 254 merge into a common water line 246 upstream of the reservoir although in other examples, the water lines may not merge. The water may be treated and processed locally in the dedicated water reservoirs before being transferred into common water reservoir 268 where the water collected from the engine system is merged with water collected from the other sources. In addition to abovementioned collectors that harvest water passively, water may also be generated actively via operation of an extractor 290 that is capable of extracting water from ambient air. In particular, extractor 290 may be configured to draw in ambient air (such as from outside the vehicle or from within the vehicle cabin) through a filter 260 and direct cleaned air through an evaporator 217 and a condenser 218 using electrical power. In one example, the condenser and the evaporator may be coiled and nested together allowing for greater surface area of both the evaporator and the condenser and increasing the efficiency of the extractor 290. In particular, the coiled configuration may allow greater amounts of air to be moved through the extractor 290, thereby increasing the output of condensation. The extractor 290 may be operated using energy derived from an electric machine 219, which may be an electric motor. Alternatively, the extractor 290 may draw power from another energy source on-board the vehicle, such as a battery, an alternator, or solar cells (such as battery 150, alternator 126, or solar cells 108 of FIG. 1). Condensation collected at the evaporator 217 is directed one or more water processing components 262 including water collection valves, collection pumps, collection filters, etc. These components may be similar to those described earlier with reference to the HVAC system 208 and engine system 110. The collected water is then delivered along extracted water line 264 to the common reservoir 268. For example, water collected by the extractor 220 may be initially stored in one of a plurality of water reservoirs 168. The water may be treated and processed locally in the dedicated water reservoirs before being transferred into common water reservoir 268 where the water collected from the engine system is merged with water collected from the other sources.

During conditions when water levels in the reservoir 268 are low and increased water usage is required or anticipated over a drive cycle, water extractor 290 is operated using electrical energy to generate water. However, drawing electrical power to generate water can adversely affect the overall fuel economy of the vehicle, in addition to conflicting with other electrical demands of the vehicle (such as for propulsion, etc.). As elaborated with reference to FIGS. 3-4, to reduce the fuel economy impact of the water generation system, vehicle controller 190 may be configured to opportunistically operate the extractor using excess electrical energy generated on-board the vehicle. For example, excess electrical energy generated via regenerative braking during a vehicle deceleration event can be used to operate the water generation system. Herein the excess electrical energy refers to energy in excess of what can be stored in a system high voltage (e.g. 48V) battery. As another example, excess solar energy can be harvested for operating the water generation system, the energy harvested in the form of stored water. As yet another example, engine braking energy can be harvested via a smart alternator in the form of stored water. The energy used and converted to water is already created regardless of water generation, whereas, if the water generator were operated on demand on continuously, new energy would have to created to meet the electrical demand for water generation. By operating the electric water generator whenever excess power is available from the vehicle, the fuel economy of the vehicle is improved.

Based on the source of the water as well as the intended use, the one or more engine water processing components coupled to each water line 224, 234, 244, 254, 264 may be distinct. For example, additional filters may be included in the surface water line in anticipation of more dirt particles in the water. As another example, additional water heating elements may be present in the extracted water line in anticipation of the extracted water being at a lower temperature. As yet another example, additional water cooling elements may be present in the engine water line in anticipation of the extracted water being at a higher temperature.

Common reservoir 268 is fluidly connected to the various water lines (that is, water lines 224, 234, 244, 246, and 254) so as to collect water from the corresponding heat-exchangers and water sources. Common reservoir 268 may be located inside or outside of the vehicle cabin 204 and may include a water level sensor 266. The water level sensor 266 may be a float disposed within the reservoir which floats on accumulated water, or any other known sensor. In some embodiments, the common water reservoir 268 may also have a heating element configured to heat the accumulated water. When included, the heating element may be disposed within the water, or may be disposed in a wall of the reservoir. Water may also be pre-heated by one or more water processing components included in the water lines, such as via water heaters or heat exchangers coupled to the water lines. For example, water in engine line 234 may be preheated upon passage through or near engine 110.

Optionally, common water reservoir may include a temperature sensor 267 configured to provide a temperature of the accumulated water. When included, the temperature sensor 267 may be submerged in the water, may be in a wall of the reservoir, or may be part of the heating element. Together, the water level sensor 266 and the water temperature sensor 267 may relay information regarding water conditions to controller 190. For example, in freezing conditions, water temperature sensor 267 detects whether the water in reservoir 268 is frozen or available for dispensing. In some embodiments, an engine coolant passage (not shown) may be thermally coupled with common reservoir 268 to thaw frozen water. The level of water stored in reservoir 268, as identified by water level sensor 266, may be communicated to the vehicle operator and/or used to adjust vehicle operation. For example, a water gauge or indication on a vehicle instrument panel (not shown) may be used to communicate the level of water. If the level of water is higher than a threshold level, it may be inferred that there is sufficient water available for injection and spraying, and accordingly water injection may be enabled by the controller while limiting water extractor operation selectively to conditions when excess electrical energy is available. Else, if the level of water in the reservoir 268 is lower than the threshold level, it may be inferred that there is insufficient water available for injection, and therefore water generation may be actively enabled using electrical power from the vehicle's battery system.

Still other sensors may be coupled to the water reservoir 268. For example, the quality of the water collected in the reservoir 268 may be assessed based on the output of a conductivity sensor coupled to the water reservoir. In other examples, the water quality may be sensed by a capacitance sensor, optical sensor, turbidity sensor, density sensor, or some other type of water quality sensor. Water reservoir 268 may further include a drain 270 including a drain valve to drain water from the reservoir to a location outside the vehicle (e.g., onto the road), such as when a quality of the water is deemed to be lower than a threshold and not suitable for injection into the engine (e.g., due to high conductivity or high particulate matter content).

Based on the intended use, one or more processing elements may also be coupled to common reservoir 268. For example, a heating element may be included to heat or boil the accumulated water. The boiling of the water may be done to remove additional impurities. A cooling element may also be included to cool the water after it has been boiled. Additionally, the heating and cooling elements may be used to maintain the accumulated water at a given temperature or within a defined temperature range.

The common reservoir 268 may be coupled to an outlet valve 272. The outlet valve 272 may be a three way valve, a proportioning valve, or other valve configuration. The outlet valve 272 may be actuated to allow the water to flow out of the reservoir 268 to distinct locations based on the intended use and the priority value of the water demand. For example, water may be dispensed along a first dispensing line 276 that extends from the outlet valve 272 to a first set of injectors, sprayers, and nozzles, such as engine water injectors, tire spray nozzles, brake spray nozzles, etc. In still further examples, distinct dispensing lines may be coupled to distinct injectors and nozzles. A second dispensing line 274 may extend from the outlet valve 272 to a potable water reservoir coupled inside the vehicle, such as inside a passenger compartment of the vehicle cabin.

The water generation system 202 may also include a display 280 for displaying information about the water generation system 202 to a vehicle operator. Information may include data such as the water level in the reservoir(s), water temperature, whether the accumulated water has been purified, time elapsed since the accumulated water has been purified, water quality, etc. The display 280 may be located in a location visible to a user in the vehicle cabin 204.

Water generation system 202 may be communicatively coupled to vehicle controller 190. Based on input from the various sensors coupled to water generation system 202, as well as other sensors coupled to vehicle system 100 (such as those described with reference to FIG. 1), controller 190 may generate signals that are sent to the various actuators coupled to water generation system 202, as well as other actuators coupled to vehicle system 100 (such as those described with reference to FIG. 1). For example, based on input from an engine knock sensor, and further based on a water level in reservoir 268, the controller 190 may command an amount of water to be dispensed from the reservoir via outlet valve 272, the dispensed water then injected into the engine cylinder via a cylinder water injector. As another example, based on input from a vehicle speed sensor, the controller 190 may command an amount of water to be sprayed onto vehicle tires and/or vehicle brakes via a tire spray nozzle and/or a brake spray nozzle. As further elaborated with reference to FIGS. 3-4, based on a water level in reservoir 268, as well as a state of charge of a system battery, the controller 190 may adjust the operation of the electric water generator (or extractor 290) for water generation. For example, the controller may proportion an amount of regenerative braking energy that is used to charge a system battery versus that is used for operating the extractor 290 via the electric machine 219.

In this way, the components of FIGS. 1-2 enable a system comprising: a vehicle with a source of regenerative electrical energy such as a smart alternator, a water generator, a reservoir, pumps, valves, lines, filters, and purifying and distribution components. An example vehicle system may comprise: vehicle wheels propelled using torque from one or more of an engine and an electric motor; a water generation system including a water extractor driven by an electric machine, the water extractor extracting water from ambient air, and a water reservoir for storing the extracted water; a system battery electrically coupled to each of the electric motor and the electric machine; a solar energy system including solar cells for capturing incident radiation, the captured incident radiation stored as charge in the system battery; a water level sensor coupled to the reservoir; a nozzle for spraying water onto a vehicle component; a vehicle speed sensor; a pedal for receiving an operator input; and a controller with computer readable instructions that when executed causes the controller to: operate the water extractor using electrical energy drawn at the electric machine from the battery when a water level in the reservoir is below a threshold; and operate the water extractor using electrical energy generated via the electric motor during vehicle deceleration, and via the solar cells during solar loading. As an example, operating the water extractor using electrical energy generated via the electric motor and the solar cells may include: during a first condition, charging the system battery until a threshold state of charge is reached while operating the water extractor at a lower flow rate; and during a second condition, operating the water extractor at a higher flow rate while charging the system battery to below the threshold state of charge. Herein the first and second conditions may be mutually exclusive. The system may further comprise a navigation system, and the controller may be configured with additional instructions that when executed cause the controller to: during the second condition (but not the first condition), predict a water usage rate of the nozzle over a drive cycle based on navigational input from the navigation system; and increase water flow from the nozzle while operating the water extractor at the higher flow rate when the water level in the reservoir is above the threshold.

Figure 3:
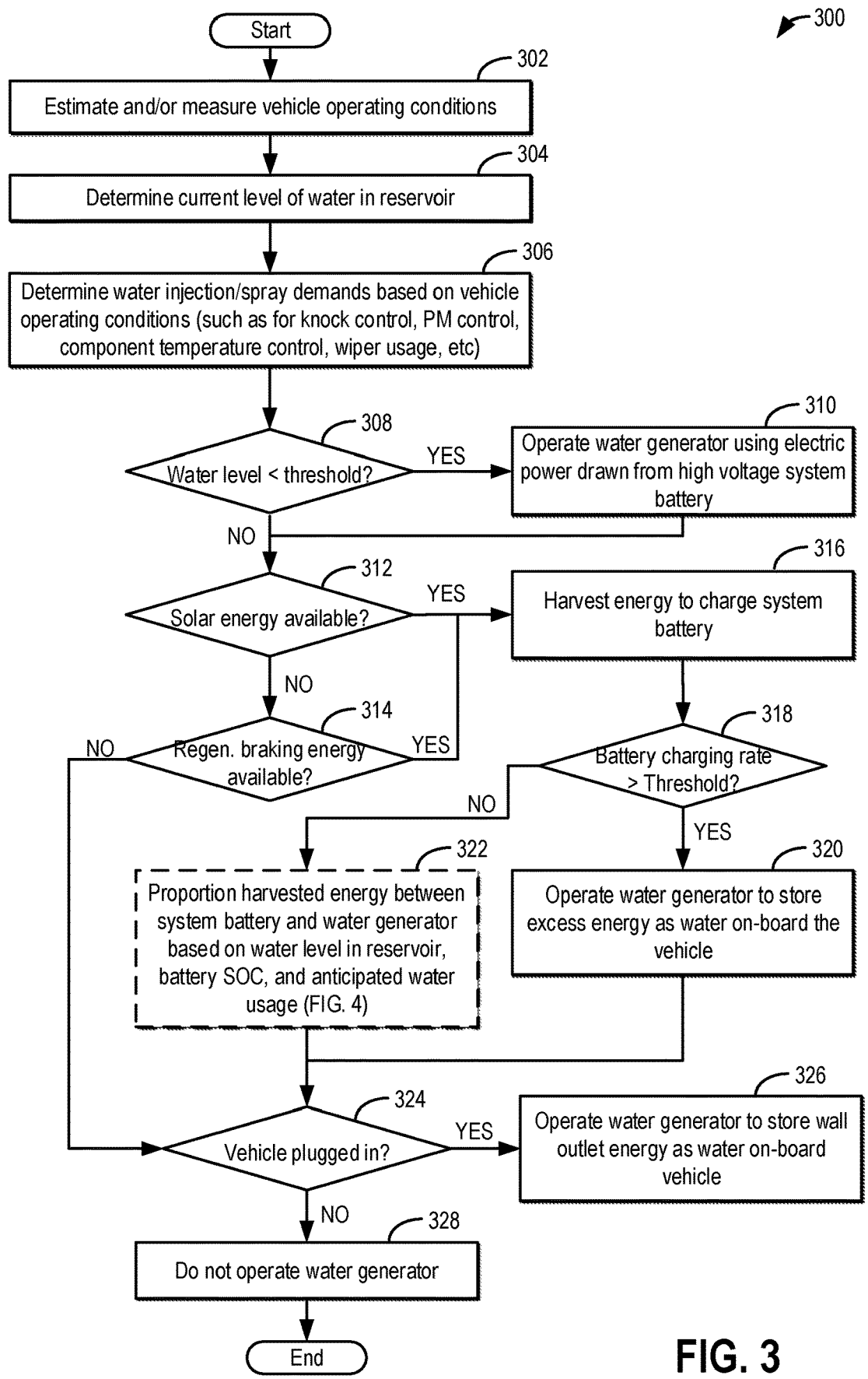
FIG. 3 shows a high level flow chart for operating an on-board water generation system based on a water level of a water reservoir, a state of charge of a system battery, and vehicle operating conditions.

Turning now to FIG. 3, an example method 300 is shown for adjusting the operation of a water generation system that requires electrical power for water generation on-board a vehicle. The method enables water to be generated opportunistically using excess electrical energy generated from excess solar energy, regenerative braking energy, and/or engine braking energy. As a result, a vehicle's fuel economy and overall performance is improved. Instructions for carrying out method 300 and the rest of the methods included herein may be executed by a controller based on instructions stored on a memory of the controller and in conjunction with signals received from sensors of the vehicle system, such as the sensors described above with reference to FIGS. 1-2. The controller may employ engine actuators of the engine system to adjust engine operation, according to the methods described below.

At 302, the method includes estimating and/or measuring vehicle operating conditions. These may include engine operating conditions such as engine speed and load, driver torque demand, ambient conditions (ambient temperature and humidity, barometric pressure, etc.), boost pressure, MAP, MAF, engine temperature, catalyst temperature, etc. In addition, vehicle operating conditions including vehicle speed, battery state of charge, vehicle emissions level, navigational input regarding a route from a point of origin to a point of destination (such as route information, weather conditions along route, traffic conditions along route, etc.) may be determined. The navigational input may be retrieved from a navigational system (e.g., global positioning system or GPS) communicatively coupled to the vehicle controller and also communicatively coupled to an internet network, such as via wireless communication.

At 304, the method includes determining the current level of water in a water reservoir of the water generation system. The current level of water may be directly measured by a fluid level sensor, or it may be estimated based on a history of water production and water consumption during the last drive cycle. In one example, the water level of a common or centralized water reservoir (such as reservoir 268 of FIG. 2) may be determined. In other examples, the water level in each distinct water reservoir of the water generation system may be determined.

At 306, the method includes determining the different water demands of the vehicle. For example, based on the operating conditions, the vehicle controller may estimate respective amounts of water to inject (e.g., directly into an engine cylinder) for engine knock control, for providing a desired level of engine dilution (e.g., into an intake manifold), for cylinder temperature control, for exhaust temperature or composition control, etc. Water may be injected into the engine responsive to knock wherein the charge cooling from the water provides knock relief, thereby reducing the reliance on spark retard for knock control. Likewise, water may be injected into the engine manifold to provide a desired engine dilution, reducing the need for EGR. Further, water may be injected into the engine responsive to elevated exhaust temperatures wherein the charge cooling from the water enables exhaust temperature control, reducing the need for enrichment of the air/fuel ratio. The controller may also determine other water demands such as the amount of water required to be sprayed onto a cylinder head for cylinder head temperature control, onto tires for tire particulate control, or onto brake pads for brake particulate control. Further still, water demand for wiper usage may be determined. As yet another example, water demand for refilling various fluids, such as wiper fluid or coolant fluid, in their respective tanks, may be determined.

In one example, the water usage may be based on current vehicle and engine operating conditions, as well as based on predicted operating conditions over the given drive cycle. The prediction may be based at least on navigational input received at the controller from a navigational system, such as a GPS. The navigational input may include, for example, traffic information along a planned route of travel from a current point of origin to a selected point of destination. Navigational input may further include weather information along the route and at the destination, road conditions (e.g., road grade, road temperature, presence of potholes or other obstructions), ambient conditions (such as humidity or altitude), distance to closest fuel refilling stations or electric charging stations, etc. As an example, during vehicle travel through a dry area or at high altitude, increased water usage for knock control may be predicted. As another example, during vehicle travel through a hot region, increased water usage for spraying onto tires and brake pads may be anticipated.

At 308, the method includes determining if the water level in a water reservoir (e.g., a common or central reservoir of the water generation system) is below a threshold. The threshold may be non-zero threshold below which it may be determined that there is insufficient water available for injection or spraying usage. In one example, the threshold is a fixed, lower threshold representative of a minimum volume of water required to be maintained in the water reservoir. In alternate examples, the threshold may be a moving threshold, the threshold adjusted as a function of the current and predicted water demands. As the amount of water currently required or predicted to be required over the drive cycle increases (as determined at 306), the threshold may be raised to ensure that the required volume of water is available at a time of water usage.

If the water level is below the threshold, then at 310, the method includes operating the water generator (in particular, the electrically powered water extractor) using electric power drawn from a high voltage system battery. The water extractor may be operated to draw moisture out of ambient air. A duration of operation may be based on the water level relative to the threshold, the water generator operator until the water level is raised at least till the threshold. Operating the water generator may include operating the water generator at a highest setting but operating the associated electric motor at its highest output. After operating the water generator to raise the water level till the threshold, the method moves to 312 to operate the water generator opportunistically to generate additional water supply. By operating the electric generator selectively to maintain the minimum water level in the reservoir, and then operating the electric generator only when excess energy is available, the fuel economy impact of water generator operation can be reduced. In addition, the occurrence of conflict between electrical power demand for operating the water generator and for powering other electrical actuators of the vehicle is reduced.

If the water level in the reservoir is above the threshold, then it may be indicated that there is at least a minimal amount of water available for usage. Once the minimum amount is confirmed, the water generator is selectively operated whenever excess energy is available to generate water while reducing an impact on the vehicle's fuel economy. In particular, at 312, it may be determined if solar energy is available. For example, it may be determined if solar cells coupled to a vehicle's roof (or other location) is generating any current. This may be based on the solar loading on the vehicle. If solar energy is available, then at 316, the method includes harvesting the solar energy to charge a system battery (such as a 48V Li-ion battery). The solar cells may be operated to convert incident solar radiation into electrical energy via a charge controller.

If solar energy is not available, at 314, it may be determined if regenerative braking energy is available. In one example, regenerative braking energy may be available when a deceleration event occurs, such as may be confirmed when a vehicle operator releases an accelerator pedal and/or depresses a brake pedal. If regenerative braking energy is available, then the method moves to 316 to harvest the regenerative braking energy to charge the system battery (such as a 48V Li-ion battery). An electric motor of the driveline may be operated as a generator to convert kinetic energy from the wheels into electrical energy via a charge controller. It will be appreciated that in addition to harvesting solar energy from the solar cells of the vehicle, the controller may harvest the regenerative braking energy from wheels. For example, both solar energy and regenerative braking energy may be harvested during vehicle travel on a hot day during vehicle deceleration. If regenerative braking energy is not available, the method moves to 324.

Energy may be harvested opportunistically for a duration until the battery reaches a threshold state of charge (SOC) or a threshold charging rate. In one example, the threshold SOC is 95%, and the threshold charging rate is 1 kW. Above the threshold charge/charging rate, the battery may not be able to accept additional charge without undergoing a degradation in battery performance or life. Thus at 318, it is determined if the battery has reached the threshold state of charge or rate of charging. If yes, then at 320, after charging the battery to the threshold SOC, the method includes operating the water generator via its associated electric machine to store the excess (solar and/or regenerative braking) energy as water on-board the vehicle. Operating the water generator using the excess energy includes operating the electric machine of the water generator with an output that is determined as a function of the available excess energy. For example, a rate of water generation may be commanded to the water extractor, the rate determined as a function of the excess energy available. For example, if regenerative braking can produce 4 kW of energy, but only 1 kW can go to charging the battery, 3 kW would be wasted on friction or compression braking unless used to produce work (i.e., generate water). The smart alternator can be commanded to deliver 3 kW to the vehicle electrical system, 1 kW to the battery, 2 kW to the water system, and 1 kW to compression braking. As an example, during a deceleration event, the controller may compare a current vehicle speed at a time of the deceleration request to a target vehicle speed required based on the deceleration request (e.g., based on the degree of brake pedal actuation). A total amount of regenerative braking energy available is determined as a function of the speed difference. An amount of charge that would be transferred to the system battery if all of the regenerative braking energy were harvested at the system battery is then determined. If a sum of the current SOC of the battery and the amount of charge transfer that is possible exceeds the threshold SOC, then it may be determined that excess energy is available for water generation. The controller may then determine the excess SOC (in excess of the threshold) that is available, and convert it back to a corresponding amount of excess regenerative braking energy. An output (e.g., target flow rate or generation rate) is then commanded to the water generator, the output proportional to the amount of excess regenerative braking energy. In some examples, the discussed steps of this example may be executed via a model, an algorithm, or a look-up table that uses the vehicle speed (current and target) and current battery SOC as inputs, and which generates a signal to be commanded to the water generator as an output.

By storing the excess solar energy and regenerative braking energy as water, the essentially "free" excess energy is leveraged for water generation, reducing the need for dedicated operation of the electric water extractor. At the same time, by not overfilling the battery, battery performance and life is extended. In addition, by transferring the excess regenerative braking energy the water generator, a target vehicle speed can be achieved during a deceleration event with reduced need for applying friction brakes (for example, with no application of friction brakes). The reduced friction braking improves the brake system life.

If the threshold state of charge of the battery is not reached, optionally at 322, the method can include proportioning the harvested solar or regenerative braking energy between the system battery and the water generator as a function of the water level in the reservoir, the battery SOC, and the anticipated water usage. As elaborated with reference to FIG. 4, this may include not charging the battery all the way to the threshold SOC (or at the threshold charging rate) during selected conditions. Instead, the battery may be charged to a lower SOC (or at a lower charging rate) so as to transfer a larger proportion of the available energy to the water generator for water generation. In doing so, water usage and battery charging can be optimized.

From each of 320 and 322, the method moves to 324 to determine if the vehicle is plugged in. In one example, the vehicle may be plugged into a wall outlet (e.g., in a garage or parking station) via a cable. When plugged in, the vehicle may be held stationary, and may be receiving electrical power for charging the system battery before a subsequent drive cycle is initiated. If the vehicle is already plugged into the wall outlet, then at 326, the method includes operating the water generator using the wall outlet charging energy and saving the energy as stored water on-board the vehicle. In one example, when the vehicle is charging at the wall outlet, a pre-programmed level of water generation may be commanded so as not to interfere with the other electrical charging functions of the vehicle. If the vehicle is not plugged in, the method moves to 328 and includes not operating the water generator. For example, the water generator may be maintained disabled.

It will be appreciated that still other sources of excess energy on-board the vehicle may be similarly leveraged for water generation. These may include, for example, wind energy, engine compression braking energy, friction braking, etc.

Figure 4:
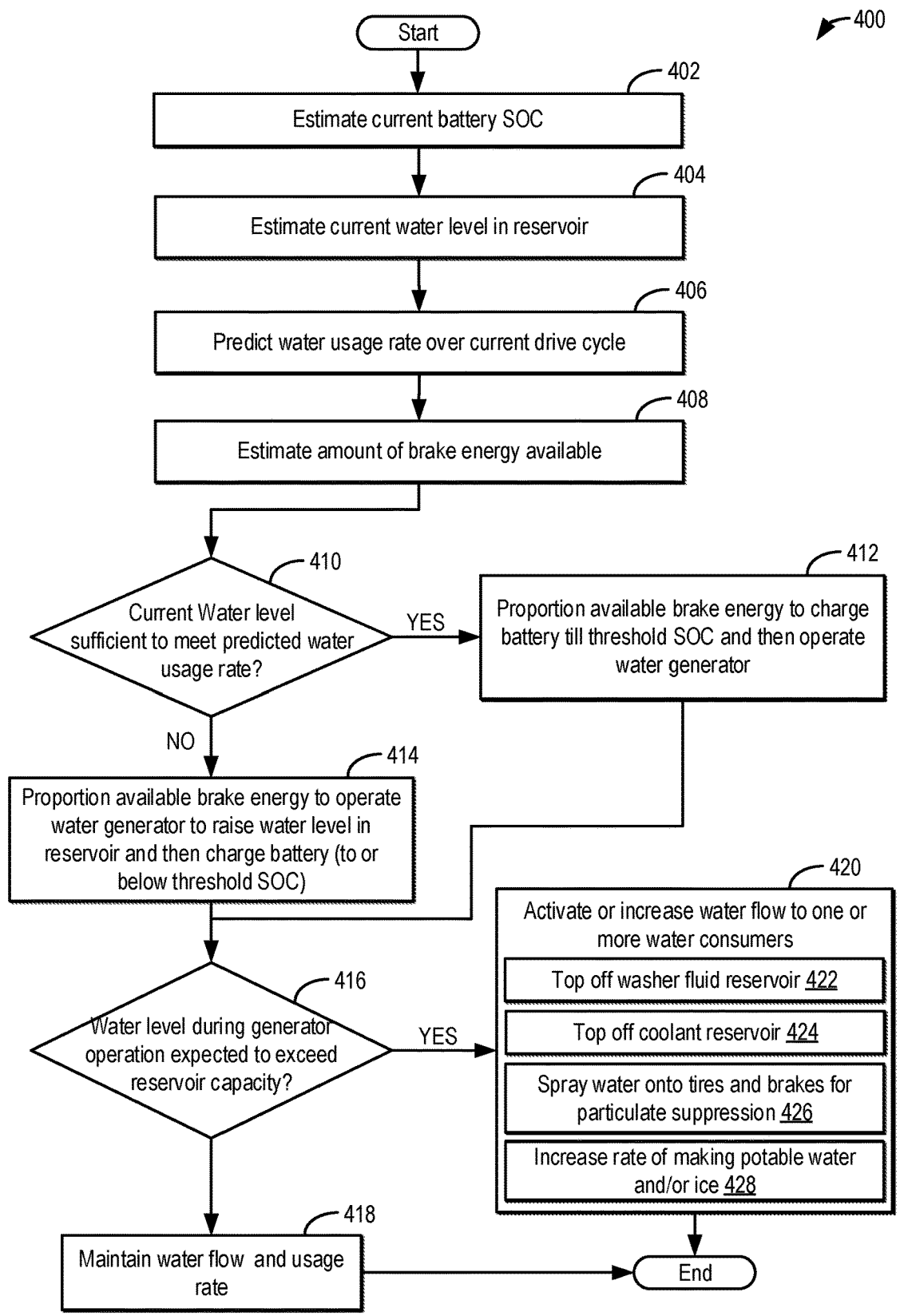
FIG. 4 shows a high level flow chart for adjusting a proportioning of braking energy between charging a system battery and operating a water generation system, including adjusting a rate of water usage, based at least on a water level in the water reservoir.

Turning now to FIG. 4, an example method 400 is shown for proportioning electrical energy generated from solar energy, regenerative braking energy, engine braking energy, or other sources on-board a vehicle between a water generator and a system battery. The method enables water levels in a water reservoir of the vehicle to be maintained at levels that enable a desired rate of water usage. In addition, battery charging and water generation can be optimized. Method 400 may be executed by a controller based on instructions stored on a memory of the controller and in conjunction with signals received from sensors of the vehicle system, such as the sensors described above with reference to FIGS. 1-2. The method of FIG. 4 may be performed as a part of the method of FIG. 3, such as at 322. It will be appreciated that while the method of FIG. 4 describes proportioning of regenerative braking energy, other sources of energy, such as solar energy, may be similarly proportioned.

At 402, the method includes estimating a current battery state of charge (SOC). The battery SOC may be determined via a current sensor coupled to the battery. Alternatively, the SOC may be retrieved from the controller's memory. The controller may continually update the battery SOC based on battery usage data and battery charging data.

At 404, the method includes estimating a current water level in a water reservoir on-board the vehicle. The reservoir may be a common or central water reservoir that dispenses water to various water injectors and nozzles. The water level may be estimated via a water level sensor. Alternatively, the water level may be retrieved from the controller's memory. The controller may continually update the water level based on water usage data and water generation data.

At 406, the method includes predicting a water usage rate over the current drive cycle. The water usage rate may be predicted based on the operating conditions. The vehicle controller may estimate respective amounts of water to deliver (e.g., directly inject into or spray onto an engine component) for engine knock control, for cylinder temperature control, for exhaust temperature or composition control, for engine dilution control, for cylinder head temperature control, for tire particulate control, for brake particulate control, for windshield wiping, for cleaning CCD cameras of the vehicle, etc.

The predicted water usage may be based at least on navigational input received at the controller from a navigational system, such as a GPS. The navigational input may include, for example, traffic information along a planned route of travel from a current point of origin to a selected point of destination. Navigational input may further include weather information along the route and at the destination, road conditions (e.g., road grade, road temperature, presence of potholes or other obstructions), ambient conditions (such as humidity or altitude), distance to closest fuel refilling stations or electric charging stations, etc. As an example, during vehicle travel through a dry area or at high altitude, increased water usage for knock control may be predicted. As another example, during vehicle travel through a hot region, increased water usage for spraying onto tires and brake pads may be anticipated. Based on all the water usage anticipated over the drive cycle, the controller may determine an estimated rate of water usage, or an estimated total amount of water required.

At 408, an amount of brake energy available during a deceleration event may be estimated. The brake energy may include regenerative braking energy and/or engine compression braking energy. The total amount of brake energy available may be determined as a function of a desired change in vehicle speed (e.g., absolute amount of speed reduction requested, rate of speed reduction requested, etc.). Additionally or optionally, the total amount of brake energy available may be determined as a function of a change in pedal position, the change in pedal position triggering the deceleration event.

At 410, it may be determined if the current water level in the reservoir is sufficient to meet the predicted water usage rate. For example, the predicted rate of water usage estimated at 406 may be compared to the current water level estimated at 404. If there is sufficient water available to meet the current and the predicted water usage demand, then at 412, the method includes proportioning the available brake energy at a first ratio wherein brake energy is used to charge the system battery till a threshold SOC (e.g., till the battery is 95% full) and then operate the water generator with any excess energy remaining after charging the battery. For example, the first ratio may include a larger proportion of the total brake energy being directed to an electric motor/generator coupled to the system battery and a remaining, smaller proportion of the total brake energy being directed to an electric machine driving the water generator. In addition, the first ratio may include directing energy initially towards the electric motor coupled to the system battery and then directing energy towards the electric machine driving the water generator. As a result, water is opportunistically generated while ensuring that the battery is sufficiently charged.

If the current water level in the reservoir is not sufficient to meet the predicted water usage rate, then at 414, the method includes proportioning the available brake energy at a second ratio, different from the first ratio, wherein brake energy is used to operate the water generator and raise the water level in the water reservoir (e.g., to a level that meets the predicted water usage rate), and then charge the system battery. As a result, the battery may be charged to or below the threshold SOC based on the amount of excess energy remaining after generating water. For example, the second ratio may include a larger proportion of the total brake energy being directed to the electric machine driving the water generator and a remaining, smaller proportion of the total brake energy being directed to the electric motor/generator coupled to the system battery. In addition, the second ratio may include directing energy initially towards the electric machine driving the water generator, and then directing energy towards the electric motor coupled to the system battery. As a result, water is opportunistically generated using excess electrical energy to ensure that sufficient water is available for use on-board the vehicle.

From each of 412 and 414, the method moves to 416 wherein it is determined if the water level during water generator operation is expected to exceed the reservoir capacity. For example, it may be determined if the amount of water generated using the brake energy, while maintaining the battery at or below the threshold SOC (and while proportioning in either the first or the second ratio), will exceed the water capacity of the reservoir. If yes, then at 420, the method includes, while operating the water generator to generate water using brake energy, activating or increasing water flow to one or more water consumers. In other words, while generating water using regenerative braking energy (e.g., excess energy), water usage is actively increased, independent of operator requested water demand. Any water actuator that can be operated in advance of operator demand, without incurring a fuel penalty, may be enabled.

As an example, at 422, water may be directed to a wiper fluid reservoir to top off the reservoir while providing a target wiper fluid composition. Further still, wiper fluid usage may be increased. For example, fluid may be sprayed to clean a windshield as well as for washing vehicle CCD cameras. Similarly, camera washers may also be operated at a higher rate. As another example, at 424, water may be directed to a coolant reservoir to top off the reservoir while providing a target coolant composition. As yet another example, water may be actively sprayed onto tires and brake pads for particulate suppression. As still another example, at 428, the controller may increase a rate of water purification for making potable water and/or ice for consumption on-board the vehicle. If the water level during generator operating is not expected to exceed the storage capacity, the water flow and usage rate is maintained.

In this way, by increasing the rate of water usage while generating water with the energy, sources of excess energy can be captured as work to generate water or perform tasks involving water usage that would otherwise have required electrical energy from the vehicle. In addition, the use regenerative braking energy enables wear of friction brakes to be reduced while enabling vehicle speed control. This may be particularly advantageous on heavy trucks.

Figure 5:
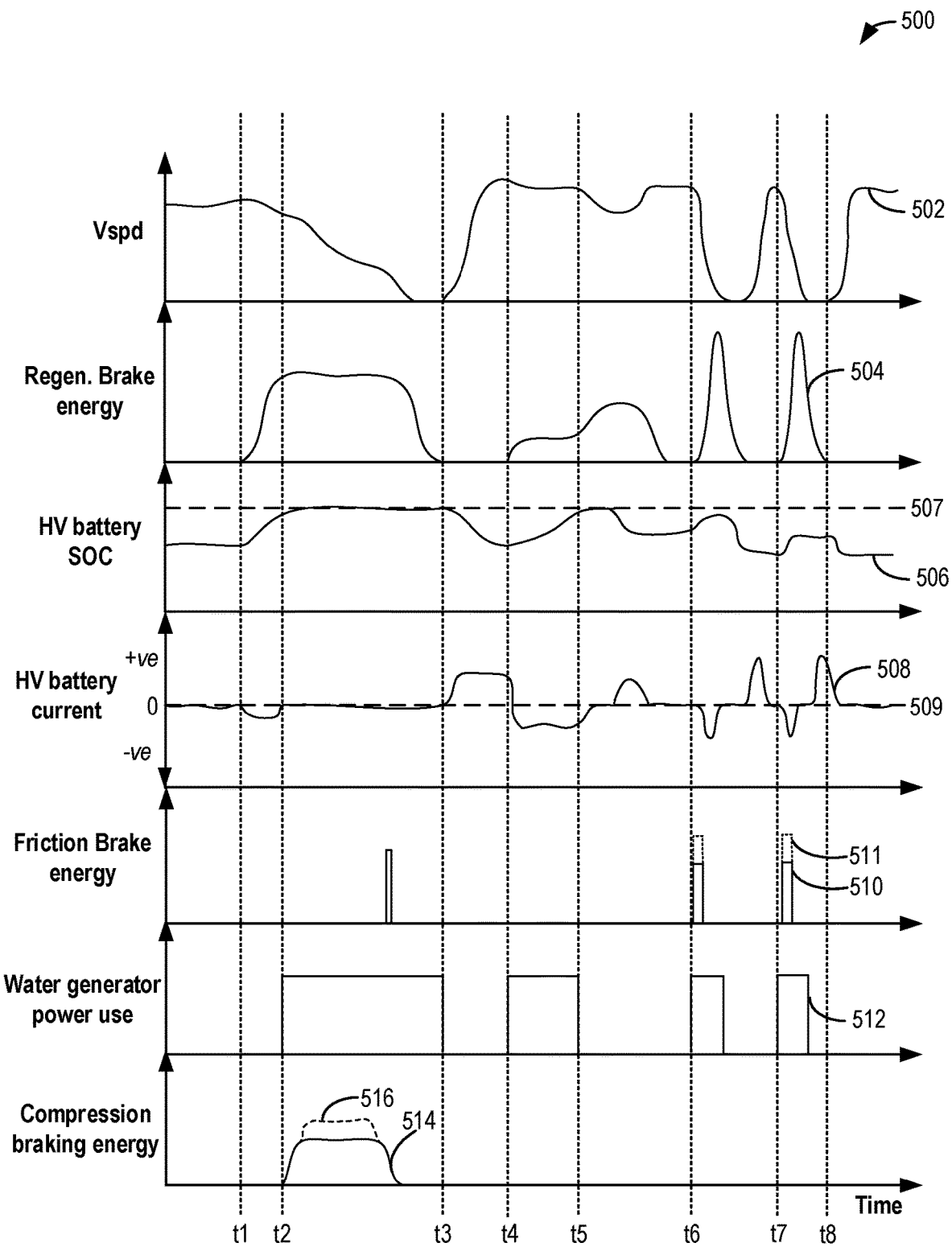
FIG. 5 shows a prophetic example of using regenerative braking energy for operating a water generation system on-board a vehicle.

Turning now to FIG. 5, an example coordination of water generator operation with battery charging is shown. Map 500 depicts vehicle speed (Vspd) at plot 502, and regenerative braking energy at plot 504. Regenerative braking energy is indicative of the braking effect that occurs in vehicles when an accelerator pedal is released and the kinetic energy of the moving wheels is used to power a motor as a generator to charge a system battery. The resulting regenerative braking force can be used to decelerate a vehicle without applying friction brakes. The regenerative braking energy can also be used to power an electric water generator. A high voltage system battery's state of charge (SOC) is shown at plot 506, relative to a threshold SOC 507. The battery's current is shown at plot 508. When the current is positive (+ve), charge is drawn out of the battery. When the current is negative (−ve), charge is transferred into the battery. Friction brake energy (indicative of use of friction brakes coupled to vehicle tires) is shown at plot 510. Water generator power usage is shown at plot 512. When the water generator uses power, water is generated on-board the vehicle and stored in a reservoir. Compression braking energy is shown at plot 514. Compression braking energy is indicative of the braking effect that occurs in engines when an accelerator pedal is released causing an intake throttle valve to close and air flow through an engine intake to become greatly restricted (but not cut off completely). The resulting high manifold vacuum which the cylinders have to work against generates an engine braking force which can be used to decelerate a vehicle without applying friction brakes. It will be appreciated that all friction braking energy and compression braking energy is energy that is wasted, negatively impacting efficiency and fuel economy. As depicted in FIG. 5, between times t2 and t3, energy is first sent to the battery until approaches its limit, at which time regenerative energy is also sent to first compression braking, then a portion is finally sent to friction braking. The proportion of each is in relation to each's ability to absorb or dissipate energy with diminishing benefit.

Prior to t1, the vehicle is moving at a steady vehicle speed. The battery is being propelled using engine torque, and therefore the battery SOC remains substantially constant. At t1, responsive to an operator releasing an accelerator pedal, a deceleration event is confirmed. Due to the vehicle speed being high at the time of the deceleration event (e.g., above 30 mph), a combination of regenerative braking energy, friction brake energy, and water generation is used to decelerate the vehicle. In particular, as the vehicle slows, an intake throttle is closed and compression braking is used to lower the vehicle speed initially. Then, regenerative braking energy is used to further reduce the vehicle speed. This regenerative braking energy is recovered between t1 and t3, until the vehicle is around 3 mph, at which time friction brakes are used to stop the vehicle. Between t1 and t2, the regenerative braking energy is first directed into the battery. This results in a negative battery current and a gradual rise in battery SOC.

At t2, however, the battery is at the threshold SOC 507, and cannot accept any further charge. For example, the charging rate may be too high and exceeds a maximum battery charging current, which is a negative battery current clip. Once the battery reaches the threshold, at t2, the water generator is operated to generate water from the excess energy. If regenerative braking were not used to generate water after the battery was charged, the remaining energy would have been thrown away as additional compression braking, as indicated by dashed segment 516. Energy used during this time for water generation is therefore free from a fuel economy standpoint, provided it reduces the compression braking. If the braking requirement were to also exceed the ability of compression braking, the friction brakes would need to be used. By using the energy during this time for water generation, the need to use compression or friction braking is reduced. At t3, vehicle speed increases, and to provide this, current is drawn from the battery which results in a drop in the battery SOC. At t4, the vehicle starts to decelerate again. However this time the vehicle speed reduction required is smaller and therefore compression braking is not required. All of the deceleration is provided via regenerative braking. The battery is able to accept charge and capture a portion of the regenerative braking energy between t4 and t5 while water is also concurrently generated to capture the remaining portion of the regenerative braking energy. Then battery is once again at the threshold SOC at t5.

Between t5 and t8, as the vehicle speed changes, based on the amount of vehicle deceleration required, as well as a vehicle speed at which the deceleration is requested, a combination of regenerative braking and water generation is used to decelerate the vehicle, while aiming to minimize friction braking. Friction braking that would have been required if water generation was not performed is shown at dashed segments 511. By reducing the need for friction braking and compression braking, fuel economy of the vehicle is improved while providing the requested vehicle speed reduction.

In this way, a stand-alone electric water generator of a vehicle can be used for generating water on-demand without degrading the fuel economy of the vehicle. By using a portion of the regenerative braking energy required to decelerate a vehicle to charge a system battery while using the remaining portion to operate the water generator, the "free" energy can be captured as work that is saved on the vehicle as stored water. By limiting the battery charging to a threshold, battery performance issues related to overfilling are averted. By using the excess energy remaining after charging the battery to power the water generator, the need for fuel inefficient compression braking or friction braking to decelerate the vehicle is reduced. In addition, lower friction braking reduces the wear on friction brakes. By opportunistically harnessing energy sources such as regenerative braking energy and solar energy to operate the water generator, the need to generate water by drawing electrical power from the vehicle, which may otherwise be needed for uses such as vehicle propulsion, an overall fuel economy of the vehicle is improved without comprising water usage. By improving water availability, the use of water available on-board a vehicle can be extended over a wider range of operating conditions.

One example method comprises: selectively operating a water generator on-board a vehicle using excess electrical energy, generated at the vehicle, to harvest water from ambient air, the selectively operating based on a water level in a reservoir storing the harvested water and a state of charge of a system battery. In the preceding example, additionally or optionally, the selectively operating includes operating the water generator using the excess electrical energy when the water level in the reservoir is above a lower threshold. In any or all of the preceding examples, additionally or optionally, the method further comprises, when the water level in the reservoir is below the lower threshold, operating the water generator using electrical energy drawn from the system battery. In any or all of the preceding examples, additionally or optionally, the water generator is selectively operated using the excess electrical energy until the water level in the reservoir is higher than an upper threshold, the upper threshold larger than the lower threshold, and then increasing water usage on-board the vehicle. In any or all of the preceding examples, additionally or optionally, increasing water usage includes one or more of spraying water onto a cylinder head, spraying water onto a tire, spraying water onto a brake rotor, injecting water into a vehicle engine, increasing usage of a windshield wiper, and topping off a coolant and/or a windshield wiper reservoir. In any or all of the preceding examples, additionally or optionally, the selectively operating includes operating the water generator using the excess electrical energy after charging the system battery to a threshold state of charge using the excess electrical energy. In any or all of the preceding examples, additionally or optionally, the selectively operating includes using a first portion of the excess electrical energy to charge the system battery while concurrently using a second, remaining portion of the excess electrical energy to operate the water extractor, a ratio of the first portion to the second portion adjusted based on the water level and the state of charge. In any or all of the preceding examples, additionally or optionally, the second portion is increased relative to the first portion as the water level in the reservoir decreases or as the state of charge of the system battery increases. In any or all of the preceding examples, additionally or optionally, the ratio is further adjusted as a function of predicted water usage over a drive cycle, the second portion increased relative to the first portion as the predicted water usage increases. In any or all of the preceding examples, additionally or optionally, the excess electrical energy includes regenerative braking energy from a vehicle deceleration event, the regenerative braking energy captured via an electric motor. In any or all of the preceding examples, additionally or optionally, the excess electrical energy includes solar energy from solar loading of the vehicle, the solar energy captured via solar cells coupled to an outer surface of the vehicle. In any or all of the preceding examples, additionally or optionally, the excess electrical energy includes engine compression braking energy from a vehicle deceleration event, the compression braking energy captured via an alternator of the vehicle.

Another example method for a hybrid vehicle comprises: selectively operating an electrically actuated water extractor using electrical energy drawn from a system battery based on a water level in a water storage tank of the vehicle; and responsive to a vehicle braking event, operating the electrically actuated water extractor using electrical energy generated from regenerative braking independent of the water level. In any or all of the preceding examples, additionally or optionally, operating the electrically actuated water extractor using electrical energy generated from regenerative braking includes: reducing a vehicle speed to a first level during the braking event by applying a negative torque from an electric motor on a driveline of the vehicle while charging the system battery at or below a threshold rate of charging; and reducing the vehicle speed to a second level, lower than the first level, during the braking event by applying a negative torque from an electric machine coupled to the water extractor on the driveline while generating water. In any or all of the preceding examples, additionally or optionally, the method further comprises, reducing the vehicle speed from the second level to a third level by applying friction brakes or via compression engine braking. In any or all of the preceding examples, additionally or optionally, the negative torque from the electric machine is increased relative to the negative torque from the electric motor as the water level in the water reservoir decreases. In any or all of the preceding examples, additionally or optionally, the method further comprises, responsive to the water level in the water exceeding a threshold while applying the negative torque from the electric machine, maintaining the negative torque while increase water usage on-board the vehicle.

An example vehicle system, comprises: vehicle wheels propelled using torque from one or more of an engine and an electric motor; a water generation system including a water extractor driven by an electric machine, the water extractor extracting water from ambient air, and a water reservoir for storing the extracted water; a system battery electrically coupled to each of the electric motor and the electric machine; a solar energy system including solar cells for capturing incident radiation, the captured incident radiation stored as charge in the system battery; a water level sensor coupled to the reservoir; a nozzle for spraying water onto a vehicle component; a vehicle speed sensor; a pedal for receiving an operator input; and a controller with computer readable instructions that when executed causes the controller to: operate the water extractor using electrical energy drawn at the electric machine from the battery when a water level in the reservoir is below a threshold; and operate the water extractor using electrical energy generated via the electric motor during vehicle deceleration, and via the solar cells during solar loading. In any or all of the preceding examples, additionally or optionally, operating the water extractor using electrical energy generated via the electric motor and the solar cells includes: during a first condition, charging the system battery until a threshold state of charge is reached while operating the water extractor at a lower flow rate; and during a second condition, operating the water extractor at a higher flow rate while charging the system battery to below the threshold state of charge. In any or all of the preceding examples, additionally or optionally, the system further comprises a navigation system, wherein the controller includes further instructions that when executed cause the controller to: during the second condition, predict a water usage rate of the nozzle over a drive cycle based on navigational input from the navigation system; and increase water flow from the nozzle while operating the water extractor at the higher flow rate when the water level in the reservoir is above the threshold. In a further representation, the vehicle system is a hybrid vehicle system.

In a further representation, a method for a vehicle includes, during a first vehicle deceleration event, applying regenerative braking energy via an electric motor to decelerate the vehicle, dehumidifying ambient air by operating a water extractor on-board the vehicle using a larger proportion of the regenerative braking energy, and charging a system battery coupled to the electric motor using a remaining, smaller proportion of the regenerative braking energy. In comparison, during a second vehicle deceleration event, the method includes applying regenerative braking energy via an electric motor to decelerate the vehicle, charging the system battery coupled to the electric motor using the larger proportion of the regenerative braking energy, and dehumidifying ambient air by operating the water extractor on-board the vehicle using the remaining, smaller proportion of the regenerative braking energy. In the preceding example, additionally or optionally, the first and second deceleration event include vehicle deceleration from a common vehicle speed, and wherein during the first deceleration event, a water level of a water reservoir receiving extracted water from the water extractor is lower, and during the second deceleration event, the water level of the water reservoir is higher. In any or all of the preceding examples, additionally or optionally, the first and the second deceleration event are responsive to operator application of a brake pedal or operator release of an accelerator pedal, and wherein during the first deceleration event, a battery state of charge at a time of application of the brake pedal or release of the brake pedal is higher than the battery state of charge at the corresponding time during the second deceleration event. In any or all of the preceding examples, additionally or optionally, an ambient humidity during the first deceleration event is higher than the ambient humidity during the second deceleration event. In any or all of the preceding examples, additionally or optionally, a predicted rate of water usage on-board the vehicle over a current drive cycle is higher during the first deceleration event relative to the second deceleration event, the predicted rate of water usage predicted based on navigational input and operator drive history. In any or all of the preceding examples, additionally or optionally, the first deceleration event is from a first vehicle speed, and the second deceleration event is from a second vehicle speed lower than the first vehicle speed, and wherein the regenerative braking energy applied during the first deceleration event is larger than the regenerative braking energy applied during the second deceleration event. In any or all of the preceding examples, additionally or optionally, the method includes charging the system battery to a higher final state of charge during the second deceleration event relative to the first deceleration event. In any or all of the preceding examples, additionally or optionally, the method includes actively commanding a higher rate of water delivery from one or more nozzles coupled to a vehicle component during the second deceleration event responsive to a higher than threshold water level in the water reservoir and a higher than threshold state of charge at the system battery.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
selectively operating a water generator on-board a vehicle using excess electrical energy, generated at the vehicle, to harvest water from ambient air, the selectively operating based on a water level in a reservoir storing the harvested water and a state of charge of a system battery, wherein the selectively operating includes operating the water generator using the excess electrical energy when the water level in the reservoir is above a lower threshold.

2. The method of claim 1, further comprising, when the water level in the reservoir is below the lower threshold, operating the water generator using electrical energy drawn from the system battery.

3. The method of claim 1, wherein the water generator is selectively operated using the excess electrical energy until the water level in the reservoir is higher than an upper threshold, the upper threshold larger than the lower threshold, and then increasing water usage on-board the vehicle.

4. The method of claim 3, wherein increasing water usage includes one or more of spraying water onto a cylinder head, spraying water onto a tire, spraying water onto a brake rotor, injecting water into a vehicle engine, increasing usage of a windshield wiper, and topping off a coolant and/or a windshield wiper reservoir.

5. The method of claim 1, wherein the selectively operating includes operating the water generator using the excess electrical energy after charging the system battery to a threshold state of charge using the excess electrical energy.

6. The method of claim 1, wherein the selectively operating includes using a first portion of the excess electrical energy to charge the system battery while concurrently using a second, remaining portion of the excess electrical energy to operate a water extractor, a ratio of the first portion to the second portion adjusted based on the water level and the state of charge.

7. The method of claim 6, wherein the second portion is increased relative to the first portion as the water level in the reservoir decreases or as the state of charge of the system battery increases.

8. The method of claim 6, wherein the ratio is further adjusted as a function of predicted water usage over a drive cycle, the second portion increased relative to the first portion as the predicted water usage increases.

9. The method of claim 1, wherein the excess electrical energy includes regenerative braking energy from a vehicle deceleration event, the regenerative braking energy captured via an electric motor.

10. The method of claim 1, wherein the excess electrical energy includes solar energy from solar loading of the vehicle, the solar energy captured via solar cells coupled to an outer surface of the vehicle.

11. The method of claim 1, wherein the excess electrical energy includes engine compression braking energy from a vehicle deceleration event, the compression braking energy captured via an alternator of the vehicle.

12. A method for a hybrid vehicle, comprising:
selectively operating an electrically actuated water extractor using electrical energy drawn from a system battery based on a water level in a water storage tank of the vehicle; and
responsive to a vehicle braking event, operating the electrically actuated water extractor using electrical energy generated from regenerative braking independent of the water level, wherein operating the electrically actuated water extractor using electrical energy generated from regenerative braking includes:
reducing a vehicle speed to a first level during the braking event by applying a negative torque from an electric motor on a driveline of the vehicle while charging the system battery at or below a threshold rate of charging; and
reducing the vehicle speed to a second level, lower than the first level, during the braking event by applying a negative torque from an electric machine coupled to the water extractor on the driveline while generating water.

13. The method of claim 12, further comprising:
reducing the vehicle speed from the second level to a third level by applying friction brakes or via compression engine braking.

14. The method of claim 12, wherein the negative torque from the electric machine is increased relative to the negative torque from the electric motor as the water level in a water reservoir decreases.

15. The method of claim 14, further comprising, responsive to the water level in the water reservoir exceeding a threshold while applying the negative torque from the electric machine, maintaining the negative torque while increasing water usage on-board the vehicle.

16. A vehicle system, comprising:
vehicle wheels propelled using torque from one or more of an engine and an electric motor;
a water generation system including a water extractor driven by an electric machine, the water extractor extracting water from ambient air, and a water reservoir for storing the extracted water;
a system battery electrically coupled to each of the electric motor and the electric machine;
a solar energy system including solar cells for capturing incident radiation, the captured incident radiation stored as charge in the system battery;
a water level sensor coupled to the water reservoir;
a nozzle for spraying water onto a vehicle component;
a vehicle speed sensor;
a pedal for receiving an operator input; and
a controller with computer readable instructions that when executed causes the controller to:
operate the water extractor using electrical energy drawn at the electric machine from the battery when a water level in the water reservoir is below a threshold; and
operate the water extractor using electrical energy generated via the electric motor during vehicle deceleration, and via the solar cells during solar loading.

17. The system of claim 16, wherein operating the water extractor using electrical energy generated via the electric motor and the solar cells includes:
during a first condition, charging the system battery until a threshold state of charge is reached while operating the water extractor at a lower flow rate; and
during a second condition, operating the water extractor at a higher flow rate while charging the system battery to below the threshold state of charge.

18. The system of claim 17, further comprising a navigation system, wherein the controller includes further instructions that when executed cause the controller to:
during the second condition,
predict a water usage rate of the nozzle over a drive cycle based on navigational input from the navigation system; and
increase water flow from the nozzle while operating the water extractor at the higher flow rate when the water level in the water reservoir is above the threshold.

* * * * *